US 8,615,982 B2

(12) United States Patent
Sundstrom et al.

(10) Patent No.: US 8,615,982 B2
(45) Date of Patent: Dec. 31, 2013

(54) INTEGRATED ELECTRIC VARIABLE AREA FAN NOZZLE THRUST REVERSAL ACTUATION SYSTEM

(75) Inventors: Dale B. Sundstrom, Simsbury, CT (US); Kevin Gibbons, Torrington, CT (US); Teddy L. Jones, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/252,305

(22) Filed: Oct. 4, 2011

(65) Prior Publication Data
US 2013/0008145 A1 Jan. 10, 2013

Related U.S. Application Data

(60) Provisional application No. 61/504,375, filed on Jul. 5, 2011.

(51) Int. Cl.
*F02K 3/075* (2006.01)
*F02K 1/72* (2006.01)

(52) U.S. Cl.
USPC ............. 60/226.3; 60/226.2; 60/771; 60/230; 244/110 B

(58) Field of Classification Search
USPC .......... 60/226.3, 226.2, 771, 230; 244/110 B; 239/265.25
See application file for complete search history.

(56) References Cited

U.S. PATENT DOCUMENTS

| 3,391,898 | A | * | 7/1968 | Miller ............................ 251/58 |
| 3,779,010 | A | | 12/1973 | Chamay et al. |
| 4,373,328 | A | | 2/1983 | Jones |
| 4,527,391 | A | | 7/1985 | Marx et al. |
| 4,922,713 | A | * | 5/1990 | Barbarin et al. ............. 60/226.2 |
| 5,181,676 | A | | 1/1993 | Lair |
| 5,310,117 | A | * | 5/1994 | Fage et al. ................ 239/265.29 |
| 5,448,884 | A | * | 9/1995 | Repp ................................ 60/223 |
| 5,575,147 | A | | 11/1996 | Nikkanen |
| 5,611,489 | A | * | 3/1997 | Berneuil et al. .......... 239/265.41 |
| 5,655,360 | A | * | 8/1997 | Butler .......................... 60/226.2 |
| 5,778,659 | A | | 7/1998 | Duesler et al. |
| 6,167,694 | B1 | * | 1/2001 | Davies ......................... 60/226.2 |
| 6,170,254 | B1 | | 1/2001 | Cariola |
| 7,735,778 | B2 | | 6/2010 | Lair et al. |
| 7,886,518 | B2 | | 2/2011 | Moniz et al. |

(Continued)

*Primary Examiner* — Phutthiwat Wongwian
*Assistant Examiner* — Carlos A Rivera
(74) *Attorney, Agent, or Firm* — Carlson, Gaskey & Olds, P.C.

(57) ABSTRACT

An integrated variable area fan nozzle (VAFN) and thrust reversing actuation system (TRAS) system includes movable surfaces for adjusting an exit area for bypass flow and cowls moved for directing discharge flow in a reverser manner. The movable surfaces of the VAFN and TRAS systems are both coupled for movement by a common actuator arrangement. A power drive unit drives each of the actuators on each of the actuators through a gearbox or other linkage such that one common motor or motor combination is utilized for driving all of the actuators. A series of redundant and separately actuateable locks control deployment of the surfaces of the thrust reverse system such that thrust reversing system can move to an open or deployed position only in response to each of the locks being actuated to an unlocked condition.

16 Claims, 3 Drawing Sheets

(56) References Cited

U.S. PATENT DOCUMENTS

| | | | |
|---|---|---|---|
| 2008/0105074 A1* | 5/2008 | Bristol et al. | 74/460 |
| 2009/0013664 A1* | 1/2009 | Jones et al. | 60/228 |
| 2010/0005777 A1 | 1/2010 | Marshall | |
| 2010/0192715 A1* | 8/2010 | Vauchel et al. | 74/89.35 |
| 2010/0218479 A1* | 9/2010 | Moradell-Casellas et al. | 60/226.2 |
| 2010/0218480 A1* | 9/2010 | Vauchel et al. | 60/226.2 |
| 2011/0192135 A1* | 8/2011 | Mckay et al. | 60/226.2 |
| 2012/0137654 A1* | 6/2012 | Burgess | 60/204 |
| 2012/0137656 A1* | 6/2012 | Jones et al. | 60/226.2 |

* cited by examiner

INTEGRATED ELECTRIC VARIABLE AREA FAN NOZZLE THRUST REVERSAL ACTUATION SYSTEM

CROSS REFERENCE TO RELATED APPLICATION

This application claims priority to U.S. Provisional Application No. 61/504,375 that was filed on Jul. 5, 2011.

BACKGROUND

This disclosure generally relates to a nacelle structure including both a variable area nozzle and a thrust reversal system that utilize a common actuator.

A gas turbine engine is mounted within a nacelle structure that includes structures and movable panels utilized to optimize engine operation. Many nacelle structures include both a Variable Area Fan Nozzle (VAFN) and a Thrust Reverser Actuation System (TRAS). Both of these systems are typically completely independent and require separate high performance actuation systems for proper aircraft and/or engine performance. These systems can be powered either electrically or hydraulically.

SUMMARY

An integrated VAFN and TRAS system is disclosed and includes movable surfaces for adjusting an exit area for bypass flow and cowls moved for diverting discharge flow in a thrust reversing direction. The VAFN comprises right and left side surfaces movable to adjust the exit area between a core nacelle and a fan nacelle. The TRAS includes right and left cowls movable to a position that directs discharge flow in a reverse direction. The surfaces and cowls are both coupled for movement by a common actuator arrangement. A power drive unit drives each of the actuators through a gearbox or other linkage such that one common motor or motor combination is utilized for driving all of the actuators.

Operation and movement of the cowls for the thrust reverser is controlled by a series of redundant and separately actuateable locks. The thrust reverse can move to an open or deployed position only in response to each of the locks being actuated to an unlocked condition.

These and other features disclosed herein can be best understood from the following specification and drawings, the following of which is a brief description.

DETAILED DESCRIPTION

Figure 1:
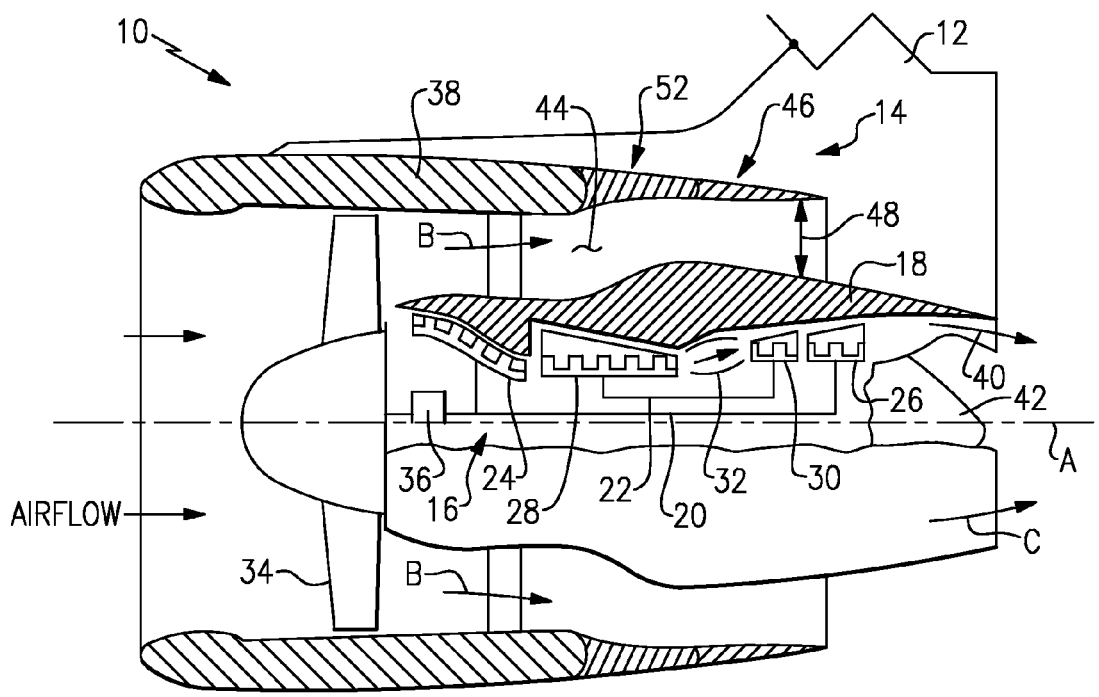
FIG. 1 is a schematic view of an example gas turbine engine and nacelle.
Figure 2:
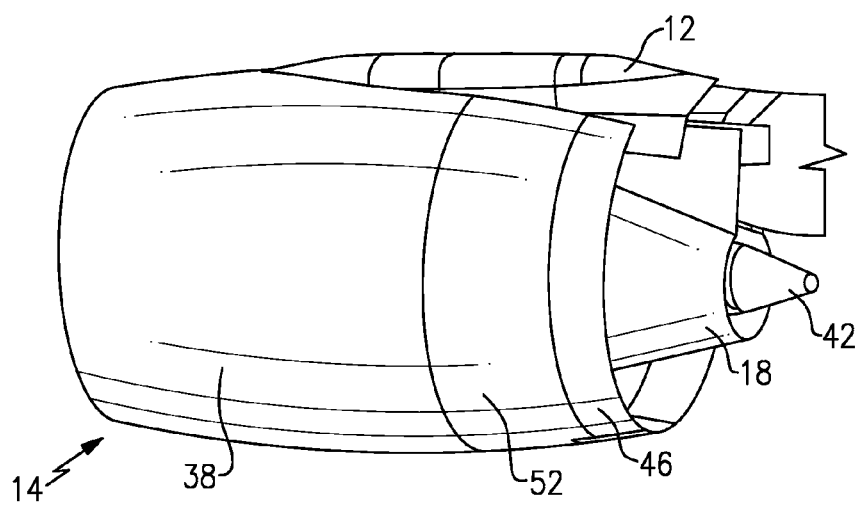
FIG. 2 is a perspective view of the example nacelle.

FIGS. 1 and 2 schematically illustrate a gas turbofan engine 10 suspended from a pylon 12 within an engine nacelle assembly 14. The turbofan engine 10 includes a core engine 16 within a core nacelle 18 that supports a low spool 20 and a high spool 22. The low spool 20 includes a low pressure compressor 24 and a low pressure turbine 26. The low spool 20 also drives a fan 34. A gear train 36 may be included between the low spool 20 and fan 34. The high spool 22 includes a high pressure compressor 28 and a high pressure turbine 30. A combustor 32 is arranged between the high pressure compressor 28 and the high pressure turbine 30. The low and high spools 20, 22 rotate about an engine axis of rotation A.

The example gas turbine engine 10 is a high-bypass geared turbofan aircraft engine. The engine bypass ratio is greater than ten (10), the fan diameter is significantly larger than that of the low pressure compressor 24, and the low pressure turbine 26 and may have a pressure ratio that is greater than 5. The fan 34 is housed within a fan nacelle 38 and is driven by the low spool 20 through the gear train 36 in the illustrated example. The example gear train 36 is an epicyclical gear train such as a planetary gear system or other gear system with a gear reduction ratio of greater than 2.5. It should be understood, however, that the above parameters are only exemplary of a geared turbofan engine and that the present invention is likewise applicable to other gas turbine engines.

Airflow enters a fan nacelle 38 that surrounds the fan 34 and at least partially surrounds the core nacelle 18. Airflow into the core engine 16 is compressed by the low and high pressure compressors 24, 28, mixed with fuel in the combustor 32 and ignited to generate a high pressure flow stream 40. The high pressure flow stream 40 exits the combustor 32 and drives the high and low pressure turbines 30, 26. The turbines 30, 26 in turn drive the corresponding compressor 24, 28. The low pressure turbine 26 also drives the fan 34, which may be through the gear train 36. Exhaust from the engine core 16 exits through a core nozzle 42 defined on an aft portion of the core nacelle 18.

A bypass flow path 44 is defined between the core nacelle 18 and the fan nacelle 38. The engine 10 generates a high bypass flow B that is communicated through the generally annular space between the core nacelle 18 and the fan nacelle 38. The bypass flow B is discharged through a variable area fan nozzle (VAFN) 46 that adjusts the annular exit area 48 between the core nacelle 18 and the fan nacelle 38. Upper and lower portion of the pylon structure 12 supporting the core engine 16 occupy portions of the annular area 48.

Thrust is a function of density, velocity, and area. One or more of these parameters can be manipulated to vary the amount and direction of thrust provided by bypass flow B. The VAFN 46 changes the physical area and geometry to manipulate the thrust provided by the bypass flow B. However, it should be understood that the exit area 48 may be effectively altered by other structural changes. Furthermore, it should be understood that effectively altering the exit area 48 is not limited to physical locations approximate the exit of the fan nacelle 38, but rather, may include the alteration of the bypass flow B at other locations.

The VAFN 46 defines the exit area 48 for discharging axially the fan bypass flow B pressurized by the upstream fan 34 of the engine 10. A significant amount of thrust is provided by the bypass flow B due to the high bypass ratio.

The example nacelle 14 further includes a thrust reverser actuation system (TRAS) 50 that directs bypass flow B and discharge from the core engine 16 in a thrust reversing direction to slow or brake the airplane once on the runway. The TRAS 50 (FIG. 3) includes at least two cowls 52 movable from the stowed position illustrated in FIG. 2, to a deployed position (not shown) blocking and directing discharge flow in a thrust reversing direction. The VAFN 46 comprises movable surfaces aft of the TRAS cowls 52 for adjusting the exit area. Movement of the VAFN 46 occurs throughout operation of the aircraft, whereas, the TRAS 50 is deployed only once the aircraft is on the ground.

Figure 3:
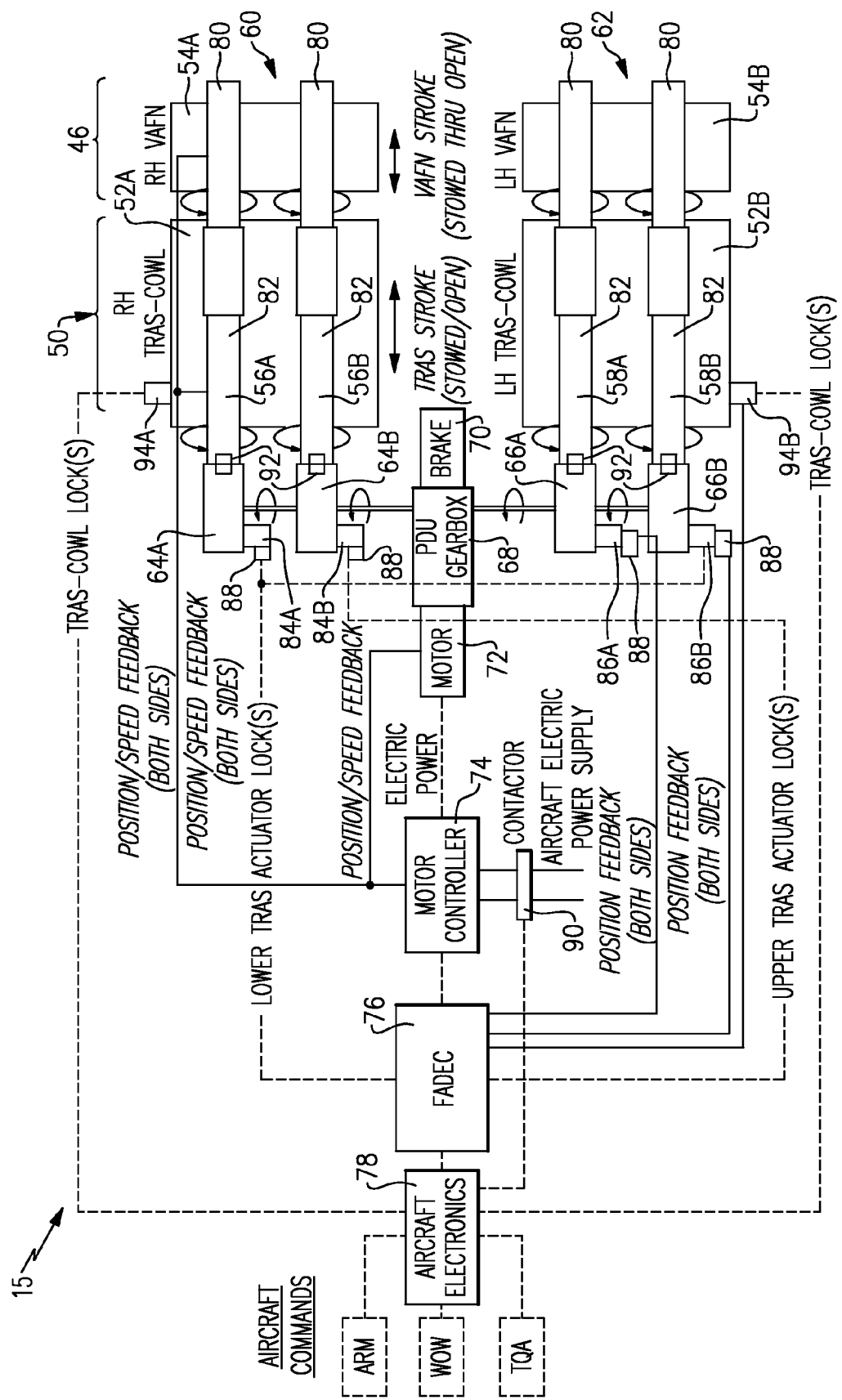
FIG. 3 is a schematic representation of an example integrated fan nozzle and thrust reverser actuation system.

Referring to FIG. 3, the integrated VAFN and TRAS system 15 is schematically shown and includes the VAFN 46 with at least two movable surfaces 54A-B. In the illustrated example, the VAFN 46 comprises a right side surface 54A and a left side surface 54B movable radially inwardly to adjust the exit area between the core nacelle 18 and the fan nacelle 38. The TRAS 50 includes a right side cowl 52A and a left side cowl 52B. The right side surface 54A of the VAFN and the right side cowl 52A of the TRAS 50 are coupled together such that both are moved by a common actuator arrangement. Similarly, the left side surface 54B of the VAFN 46 and the left side cowl 52B of the TRAS 50 are coupled together and moved by a common actuator arrangement 58A-B.

The integrated VAFN and TRAS system 15 includes a right side 60 and a left side 62. The right and left sides 60, 62 are essentially identical such that each includes a translating cowl 52A-B, of the TRAS system and a movable surface 54A-B of the VAFN. Each of the right and left sides 60, 62 includes the two actuators 56A-B, 58A-B that are both coupled to the corresponding cowl 52A-B and surface 54A-B. Each of the actuators 56A-B, 58A-B are driven through corresponding gearboxes 64A-B, 66A-B by a single power drive unit (PDU) 68. The PDU 68 provides for driving gearboxes 64A-B, 66A-B and thereby all of the actuators 56A-B, 58A-B on each of the right and left sides 60, 62 through a common drive system.

The example PDU 68 includes a brake 70 that provides for control of movement of the actuators 56A-B, 58A-B. The PDU 68 is a gearbox that is in turn driven by a motor 72. The PDU 68 drives the corresponding actuators 56A-B, 58A-B through a mechanical link such as a conventional torque-tube or flex-shaft arrangement. The example PDU 68 is driven by an electric motor 72, through a reduction gearbox and includes the brake 70.

In this example, the motor 72 is an electric motor that is controlled by a motor controller 74. The motor controller 74 is in turn controlled by a master control known a Full Authority Digital Engine Controller (FADEC) 76. The FADEC 76 controls additional aspects and systems of the aircraft such that relationships between different functions can be coordinated as is required. The FADEC 76 receives information from various aircraft electronics schematically indicated at 78 that provide data indicative of aircraft conditions and operation.

As appreciated, although an electric motor is disclosed, hydraulic powered motors could be utilized and are within the contemplation of this invention. Each of the actuators 56A-B, 58A-B includes a first portion 80 that drives the corresponding surface 54A-B for the VAFN 46 and a second portion 82 that drives the corresponding cowl 52A-B of the TRAS 50. Two actuators are provided on each side 60, 62 of the integrated system to provide redundancy to insure operation should part of the system not function as desired.

Each of the actuators 56A-B, 58A-B is driven through the corresponding gear box 64A-B, 66A-B and includes a locking mechanism 84A-B, 86A-B. In the locked position, only the first portion 80 of the actuator 56A-B, 58A-B that moves the VAFN 46 can be operated. When it is desired to deploy the cowl 52A-B of the TRAS 50, the corresponding locking mechanism 84A-B, 86A-B is commanded to move to an unlocked position. In the unlocked condition, the cowl 52A-B is free to move in response to movement of the second part 82 of the corresponding actuator 56A-B, 58A-B. An integral sensor 88 provides feedback to the FADEC 76 to signal if an actuator 56A-B, 58A-B is in the locked or unlocked condition.

The motor controller 74 supplies the power to the motor 72 and regulates motor speed. An electrical contactor 90 can be operated via an aircraft controller or the FADEC 76 to disconnect the power supply to the motor controller 74 if required to discontinue operation of the integrated VAFN and TRAS 15. Position sensors 92, located in or near each actuator 56A-B, 58A-B, provide feedback to the motor controller 74 to accurately drive either the cowls 52A-B or surfaces 54A-B into the proper position and desired state.

The motor controller 74 contains the control logic to drive either the first part 80 of that drives the VAFN 46 or the second part 82 that drives the TRAS 50 of the corresponding actuator 56A-B, 58A-B in accordance with the required system performance specifications.

Each of the cowls 52A-B is locked in position by a cowl locks 94A-B. The cowl locks 94A-B is controlled by the aircraft controller 78 to prevent opening until required. As should be appreciated, operation of the TRAS is limited to certain conditions such as when the aircraft is on the ground, and cannot be actuated in most operational conditions.

Accordingly, the example system 15 includes redundant locking features that all must be placed in an unlocked condition before movement of the cowls 52A-52B may occur. In this example, each of the actuators 56A-B, 58A-B on each side 60, 62 include a lock 84A-B, 86A-B that is independently operated. Further, the cowl locks 94A-B is further independently operated. If any of the locks 84A-B, 86A-B on any of the actuators 56A-B, 58A-B, or the cowl locks 94A-B is not unlocked, the cowl 52A-B will not move to the deployed position that redirects thrust.

The VAFN surface 54A-B can be operated completely independent of the TRAS cowls 52A-B although each are coupled to a common actuator 56A-B, 58A-B. The VAFN system receives commands from the FADEC 76 and can be commanded to be stowed (closed), full open, or to any set point in-between. Thus, only the VAFN surfaces 54A-B can be independently moved while the TRAS cowls 52A-B remain in a stowed and locked position. The TRAS cowls 52A-B are protected from inadvertent deployment through the use of the three independently operated lock mechanisms 84A-B, 86A-B and 94A-B.

In operation, the TRAS 50 receives the initial command from the pilot via an 'Arm Switch' which unlocks the cowl locks 94A-B. An open/closed lock signal is fed back into the FADEC 76. The FADEC 76 then drives the first portion 82 or the TRAS actuator to move the corresponding cowl 52A-B from the stowed position to release any load off the cowl locks 94A-B that may prevent release. The corresponding actuator locks 84A-B, 86A-B are then commanded to the unlocked position via the aircraft electronics 78. The third locking mechanism is the Lower TRAS Actuator Locks. Once all TRAS sequencing locks are verified as open, the FADEC 76 commands the PDU 68 to drive the first portion 82 of each of the actuators 56A-B, 58A-B into the fully deployed open position, thereby moving the cowls 52A-B into a position directing thrust in a reverse direction. Once the desired thrust reversing operation is complete, the FADEC 76 commands movement of the PDU 68 and the actuators 56A-B, 58A-B to move the cowls 52A-B back to the stowed position and to reengage the locks 84A-B,86A-B, and 94A-B.

The FADEC 76 contains system logic to handle normal operational scenarios for take-off, climb, cruise, descent, and landing operation. In addition, the FADEC 76 will contain the system logic to make the Integrated VAFN-TRAS Actuation System 15 function as desired for aborted landing scenarios.

Figure 4:
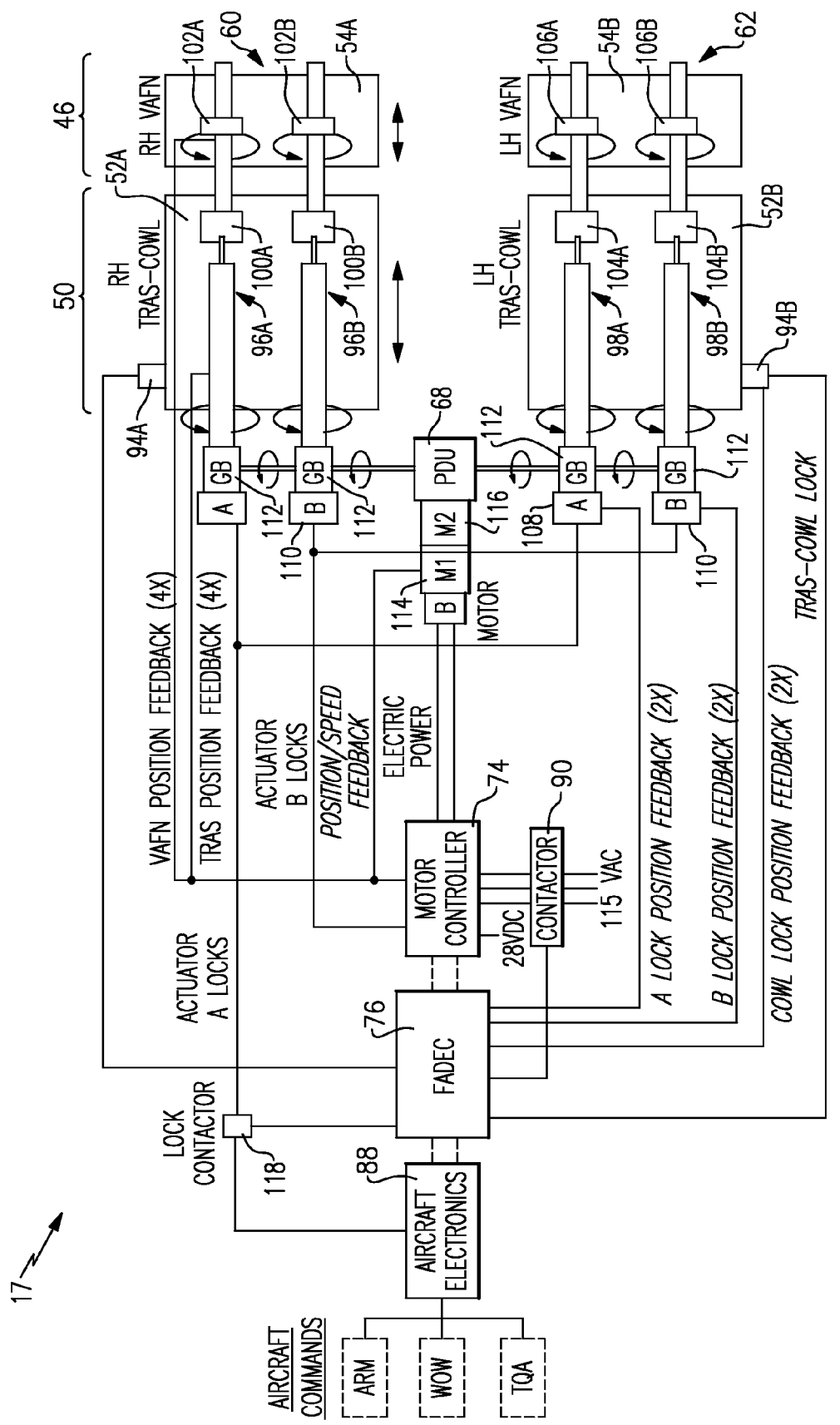
FIG. 4 is a schematic representation of another example integrated fan nozzle and thrust reverser actuation system.

Referring to FIG. 4, another integrated VAFN-TRAS Actuation System 17 is schematically shown and includes actuators 96A-B coupled to both a right side TRAS cowl 52A and VAFN surface 54A and actuators 98A-B coupled to both a left side TRAS cowl 52B and a VAFN surface 54B. Each of the actuators 96A-B, 98A-B include a selectively engageable drive that provides for selective actuation of the corresponding TRAS cowl 52A-B and VAFN surface 54A-B. The actuators 96A-B, 98A-B comprises a mechanical drive such as a ball screw that moves the corresponding surfaces through a corresponding locking lug. In this example, the actuators 96A-B, 98A-B includes selectively drivable lugs 100A-B, 104A-B coupled to the corresponding cowl 52A-B. Additional lugs 102A-B, 106A-B are coupled to the corresponding surfaces 54A-B. Each of the lugs 100A-B, 104A-B, can be selectively engaged or disengaged from the corresponding actuator 96A-B, 98A-B to provide selective independent movement of the cowls 52A-B and surfaces 54A-B.

Each of the actuators 96A-B, 98A-B include a lock 108, 110 that provides for engagement of the corresponding lug 100A-B, 104A-B. The locks 108 correspond with the "A" actuator 96A, 98A on each of the right and left sides 60, 62. The locks 110 correspond with the "B" actuator 96B, 98B on the right and left sides 60, 62. Accordingly, the "A" locks 108 are controlled together through a combination of the aircraft electronics 88 and the FADEC 76 through a lock contactor 118. The "B" locks are controlled separately by the motor controller 74. The cowl locks 94A-B is controlled by the FADEC 76. The different control paths for the "A" locks 108 and the "B" locks 110 provides a desired redundancy that prevents undesired or unauthorized operation of the thrust reverser functions.

The example PDU 68 is driven by a first motor 114 and a second motor 116. The use of two motors provides a further redundancy to assure reliable operation. Moreover, the motors may drive separate portions of the PDU 68 during different phase of operation of the integrated VAFN-TRAS actuation system 17. For example, only the first motor 114 may operate in response to operation a movement of the surfaces 54A-B. The second motor 116 may be further engaged in response to movement of the cowls 52A-B to provide additional power as may be required. As appreciated, many different motor configurations for driving the PDU 68 could be utilized and are within the contemplation of this disclosure.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A nacelle assembly for an aircraft engine comprising:
a fan nozzle movable between a first position and a second position to define a discharge flow area;
a thrust reverser movable between a stowed position and an actuated position to divert discharge flow in a thrust reversing direction;
an actuator assembly for moving both the fan nozzle and the thrust reverser, the actuator assembly including a first portion coupled to the fan nozzle and a second portion coupled to the thrust reversers, wherein the first portion and the second portion are movable along a common axis and are movable individually for moving the thrust reverser independent of the fan nozzle; wherein the first portion and second portion comprise selectable engageable lugs for selectively engaging and disengaging from the actuator assembly to provide selective independent movement of the fan nozzle and the thrust reverser;
an actuator lock preventing movement of the thrust reverser in a locked condition and allowing movement of the thrust reverser in a unlocked condition; and
a cowl lock actuateable independent of the actuator lock for preventing movement of the thrust reverser in a locked condition and allowing movement of the thrust reverser in an unlocked condition.

2. The assembly as recited in claim 1, wherein the actuator lock locks the second portion of the actuator assembly against movement in the locked condition and allows movement of the first portion, and allows movement of both the first portion and the second portion in the unlocked condition.

3. The assembly as recited in claim 1, wherein the actuator assembly comprises first and second actuators, both including first portions for moving a common fan nozzle and second portions for moving the thrust reverser, and the actuator lock comprises a first actuator lock disposed on the first actuator and a second actuator lock disposed on the second actuator, wherein each of the first actuator lock and the second actuator lock independently prevent movement of the thrust reverser when in the locked condition.

4. The assembly as recited in claim 3, including a controller for controlling operation of the first actuator lock, the second actuator lock and the cowl lock such that each of the first actuator lock, the second actuator lock, and the cowl lock can independently prevent movement of the thrust reverser to the actuated position.

5. The assembly as recited in claim 1, wherein the fan nozzle is moveable independent of movement of the thrust reverser with the actuator lock and the cowl lock in the locked condition.

6. The assembly as recited in claim 1, wherein the fan nozzle comprises a first fan nozzle and a second fan nozzle and the thrust reverser comprises a first thrust reverser and a second thrust reverser.

7. The assembly as recited in claim 3, including a gearbox driving both the first actuator assembly and the second actuator assembly.

8. The assembly as recited in claim 7, wherein each of the first portion and the second portion of the first actuator assembly and second actuator assembly are driven by the same gearbox.

9. The assembly as recited in claim 3, wherein each of the first actuator assembly and the second actuator assembly include a ball screws and each of the selectively engageable lugs are supported on the ball screws.

10. A gas turbine engine system comprising:
a fan;
a nacelle arranged about the fan;
a gas turbine engine core having a compressor, a combustor and a turbine at least partially within the nacelle;
a fan bypass passage downstream of the fan between the gas turbine engine core and the nacelle;
a fan nozzle moveable for adjusting a discharge flow area through the fan bypass passage;
a thrust reverser movable between a stowed position and an actuated position to divert discharge flow in a thrust reversing direction;
a first actuator assembly coupled to both the fan nozzle and thrust reverser;
a second actuator assembly coupled to both the fan nozzle and thrust reverser, wherein each of the first actuator and the second actuator include a first portion coupled to the fan nozzle for adjusting the position of the fan nozzle and a second portion separately coupled to the thrust reverser for moving the thrust reverser from the stowed position to the actuated position; wherein each of the first portion and second portion comprise selectable engageable lugs for selectively engaging and disengaging from each of the respective actuator assemblies to provide selective independent movement of the fan nozzle and the thrust reverser;

a power drive unit driving both the first actuator and the second actuator;

a first actuator lock disposed on the first actuator for preventing movement of the thrust reverser in a locked condition and allowing movement of the thrust reverser in an unlocked condition;

a second actuator lock disposed on the second actuator for preventing movement of the thrust reverser in a locked condition and allowing movement of the thrust reverser in an unlocked condition; and a cowl lock actuateable independent of the first actuator lock and the second actuator lock for preventing movement of the thrust reverser in a locked condition and allowing movement of the thrust reverser in an unlocked condition.

11. The gas turbine engine system as recited in claim 10, wherein both the fan nozzle and the thrust reverser comprises a first side and a second side, and each of the first side and the second side include corresponding ones of the first actuator, the second actuator, the first actuator lock, the second actuator lock and the cowl lock.

12. The gas turbine engine system as recited in claim 11, wherein the power drive unit is driven by a motor, the power drive unit driving each of the first and second actuators on both the first and second sides through a corresponding first gearbox and second gearbox.

13. The gas turbine engine system as recited in claim 11, including a controller for controlling each of the at first actuator lock, the second actuator lock and the cowl lock, the thrust reverser movable only in response to unlocking of each of the first actuator lock, the second actuator lock and the cowl lock.

14. A method of operating movable structures of a nacelle comprising:

coupling a fan nozzle moveable for adjusting a discharge flow area through a fan bypass passage to a first portion of a first actuator assembly and a second actuator assembly;

coupling a thrust reverser movable between a stowed position and an actuated position to divert discharge flow in a thrust reversing direction to a second portion of first actuator assembly and the second actuator assembly;

moving the fan nozzle with the first portion of at least one of the first actuator assembly and the second actuator assembly to a desired position between a stowed and open position;

releasing a first actuator lock and a second actuator lock that prevents movement of the thrust reverser, wherein the first actuator lock and second actuator lock comprise a mechanism for selectively engaging and disengaging the first portion and the second portion from the corresponding one of the first actuator assembly and the second actuator assembly to provide selective independent movement of the fan nozzle and the thrust reverser;

releasing a cowl lock that prevents movement of the thrust reverser;

moving the thrust reverser with the second portion of at least one of the first actuator assembly and the second actuator assembly to a desired position between a stowed and open position independent of the fan nozzle; and driving both the first portion of the first actuator assembly and the second actuator assembly and the second portion of the first actuator assembly and the second actuator assembly with a common motor.

15. The method as recited in claim 14, wherein cowl lock is separately actuateable for preventing movement of the thrust reverser independent of both the first actuator lock and the second actuator lock and releasing the cowl lock prior to moving the thrust reverse to the open position.

16. The method as recited in claim 15, including the step of preventing movement of the thrust reverser to the open position responsive to one of the first actuator lock and the second actuator lock and the cowl lock being in a locked condition.

* * * * *

UNITED STATES PATENT AND TRADEMARK OFFICE
CERTIFICATE OF CORRECTION

| | | |
|---|---|---|
| PATENT NO. | : 8,615,982 B2 | Page 1 of 1 |
| APPLICATION NO. | : 13/252305 | |
| DATED | : December 31, 2013 | |
| INVENTOR(S) | : Sundstrom et al. | |

It is certified that error appears in the above-identified patent and that said Letters Patent is hereby corrected as shown below:

IN THE CLAIMS:

Claim 8, column 6, line 41: insert --the-- after and

Signed and Sealed this
Sixth Day of May, 2014

Michelle K. Lee
*Deputy Director of the United States Patent and Trademark Office*